US011449589B2

(12) United States Patent
Gehrmann (10) Patent No.: US 11,449,589 B2
(45) Date of Patent: Sep. 20, 2022

(54) UPDATING BIOMETRIC DATA TEMPLATES

(71) Applicant: Fingerprint Cards AB, Gothenburg (SE)

(72) Inventor: Christian Gehrmann, Lund (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/492,563

(22) PCT Filed: Mar. 8, 2018

(86) PCT No.: PCT/SE2018/050221
§ 371 (c)(1),
(2) Date: Sep. 9, 2019

(87) PCT Pub. No.: WO2018/169470
PCT Pub. Date: Sep. 20, 2018

(65) Prior Publication Data
US 2020/0042684 A1    Feb. 6, 2020

(30) Foreign Application Priority Data

Mar. 13, 2017    (SE) .................................... 1750282-4

(51) Int. Cl.
*G06F 21/32* (2013.01)
*H04L 9/08* (2006.01)
(Continued)

(52) U.S. Cl.
CPC ............ *G06F 21/32* (2013.01); *H04L 9/0891* (2013.01); *H04L 9/0894* (2013.01);
(Continued)

(58) Field of Classification Search
CPC ..... H04L 63/0861; H04L 63/08; H04L 63/06; H04L 63/062; H04L 9/0866; H04L 9/088;
(Continued)

(56) References Cited

U.S. PATENT DOCUMENTS 6,507,912 B1 * 1/2003 Matyas, Jr. ........... H04L 9/3231
713/186
7,302,583 B2 * 11/2007 Forrest .................... H04L 9/085
380/44
(Continued)

FOREIGN PATENT DOCUMENTS

EP    2624206 A1 *  8/2013  ............. G06F 21/32
EP    2624206          5/2017

OTHER PUBLICATIONS

PCT International Search Report and Written Opinion dated Apr. 30, 2018 for International Application No. PCT/SE2018/050221, 12 pages.

*Primary Examiner* — Zachary A. Davis
(74) *Attorney, Agent, or Firm* — RMCK Law Group, PLC (57) ABSTRACT

The invention relates to methods and devices for updating encrypted biometric data of a user at a trusted network node. In an aspect of the invention a method performed by a first client device is provided of updating encrypted biometric data of a user, the encrypted biometric data to be updated having been previously captured by the first client device and registered at a trusted network node. The invention relates to methods and devices for updating encrypted biometric data of a user at a trusted network node. In an aspect of the invention a method performed by a first client device is provided of updating encrypted biometric data of a user, the encrypted biometric data to be updated having been previously captured by the first client device and registered at a trusted network node.

23 Claims, 7 Drawing Sheets

(51) Int. Cl.
*H04L 9/40* (2022.01)
*H04L 9/32* (2006.01)
*G06Q 20/40* (2012.01)

(52) U.S. Cl.
CPC ........ *H04L 9/3213* (2013.01); *H04L 63/0807* (2013.01); *H04L 63/0861* (2013.01); *G06Q 20/40145* (2013.01)

(58) Field of Classification Search
CPC ..... H04L 9/0894; H04L 9/3231; G06F 21/32; G06F 21/31
See application file for complete search history.

(56) References Cited

U.S. PATENT DOCUMENTS

| | | | | |
|---|---|---|---|---|
| 7,574,734 | B2* | 8/2009 | Fedronic | G07C 9/37 |
| | | | | 726/9 |
| 8,782,758 | B2* | 7/2014 | Kamakura | H04L 63/0861 |
| | | | | 726/6 |
| 9,213,818 | B2* | 12/2015 | Morris | G06F 21/32 |
| 10,079,684 | B2* | 9/2018 | Negi | H04L 9/0816 |
| 10,154,029 | B1* | 12/2018 | Griffin | H04L 9/0844 |
| 2015/0082024 | A1* | 3/2015 | Smith | H04L 67/1095 |
| | | | | 713/155 |
| 2015/0249647 | A1* | 9/2015 | Mityagin | G06F 16/176 |
| | | | | 713/168 |

* cited by examiner

UPDATING BIOMETRIC DATA TEMPLATES

CROSS-REFERENCE TO RELATED APPLICATIONS

This application is a 371 U.S. National Stage of International Application No. PCT/SE2018/050221, filed Mar. 8, 2018, which claims priority to Swedish Patent Application No. 1750282-4, filed Mar. 13, 2017. The disclosures of each of the above applications are incorporated herein by reference in their entirety.

TECHNICAL FIELD

The invention relates to methods and devices for updating encrypted biometric data of a user at a trusted network node.

BACKGROUND

In prior art multi-user biometric authentication systems, there is a need to capture biometric data at one client device implementing recognition of a user based on the biometric data, such as fingerprint recognition, while making the biometric data available for authentication at another biometric authentication device.

However, as original biometric data templates are very sensitive from a security point of view, it is of utmost important to ensure that original biometric data only is available on trusted biometrics-reading devices and that the biometric data never leaves a secure computing environment on such devices.

Biometrics allow efficient end-user identification without the need for the end-user to remember a username or password or carry a special purpose hardware token. However, while privacy implications can be mitigated when authentication based on biometric data is performed on a single device, it is very important to protect the original biometric data when transferring the biometric data between devices.

Biometric data must by definition be available at a biometric sensor. It is not controversial to store a limited amount of biometric data at a specific biometric sensor. Hence, as long as security can be guaranteed upon transferring biometric data from one device to another, it is acceptable to transfer a limited number of biometric data templates. However, there must be a mechanism in place that can ensure that the clear-text biometric data only is available in trusted biometric sensor devices and at no other locations during transfer, which is practically difficult to achieve.

SUMMARY

An object of the present invention is to solve, or at least mitigate, this problem in the art and to provide a method of enabling updating of encrypted biometric data of a user, which data has been captured by a client device and registered at a trusted network node.

This object is attained in a first aspect of the invention by a method performed by a first client device of updating encrypted biometric data of a user, the encrypted biometric data to be updated having been previously captured by the first client device and registered at a trusted network node. The method comprises capturing biometric data of the user to be used for updating the registered encrypted biometric data, encrypting the captured biometric data using a key shared with a second client device which subsequently is to access the updated encrypted biometric data, and creating a first authentication token associated with the encrypted biometric data, which first token is configured to comprise a secret to be shared between the second client device and the trusted network node upon the second client device requesting the updated encrypted biometric data. The method further comprises submitting the encrypted biometric data and the first authentication token to the trusted network node over a secure communication channel.

This object is attained in a second aspect of the invention by a first client device configured to update encrypted biometric data of a user, the encrypted biometric data to be updated having been previously captured by the first client device and registered at a trusted network node, the first client device comprising a biometric data sensing system comprising a biometric data sensor and a processing unit. The biometric data sensor is configured to capture biometric data of the user to be used for updating the registered encrypted biometric data. The processing unit is configured to encrypt the captured biometric data using a key shared with a second client device which subsequently is to access the updated encrypted biometric data, create a first authentication token associated with the encrypted biometric data, which first token is configured to comprise a secret to be shared between the second client device and the trusted network node upon the second client device requesting the updated encrypted biometric data, and submit the encrypted biometric data and the first authentication token to the trusted network node over a secure communication channel.

This object is attained in a third aspect of the invention by a method performed by a second client device of acquiring updated encrypted biometric data of a user of the second client device from a trusted network node, the encrypted biometric data having been updated at the trusted network node by a first client device. The method comprises submitting a request to the trusted network node over a secure communication channel to receive the updated encrypted biometric data which has replaced previously registered encrypted biometric data of the user, the request comprising a second authentication token associated with the previously registered encrypted biometric data, and receiving an authentication challenge from the trusted network node, if the trusted network node is capable of authenticating the second authentication token. The method further comprises providing an authentication response to the received authentication challenge using a shared secret and the authentication challenge, the shared secret having been received earlier from the trusted network node upon the second client device (600; see FIG. 6) acquiring the previously registered encrypted biometric data, and if the authentication response is correct, receiving the updated encrypted biometric data from the trusted network node and a new shared secret associated with the updated encrypted biometric data.

This object is attained in a fourth aspect of the invention by a second client device configured to acquire updated encrypted biometric data of a user of the second client device from a trusted network node, the encrypted biometric data having been updated at the trusted network node by a first client device, the second client device comprising a biometric data sensing system comprising a biometric data sensor and a processing unit. The processing unit is configured to submit a request to the trusted network node over a secure communication channel to receive the updated encrypted biometric data which has replaced previously registered encrypted biometric data of the user, the request comprising a second authentication token associated with the previously registered encrypted biometric data, and to receive an authentication challenge from the trusted network node, if the trusted network node is capable of authenticating the second authentication token. The processing unit is further configured to provide an authentication response to the received authentication challenge using a shared secret and the authentication challenge, the shared secret having been received earlier from the trusted network node upon the second client device acquiring the previously registered encrypted biometric data, and if the authentication response is correct, to receive the updated encrypted biometric data from the trusted network node and a new shared secret associated with the updated encrypted biometric data.

This object is attained in a fifth aspect of the invention by a method performed by a trusted network node of updating previously registered encrypted biometric data of a user of a first client device. The method comprises receiving, from the first client device over a secure communication channel, encrypted biometric data to be used for updating the registered encrypted biometric data and a first authentication token associated with the received encrypted biometric data, which first authentication token comprises a secret to be shared between a second client device and the trusted network node upon the second client device (600) requesting the updated encrypted biometric data, authenticating the received first authentication token, and replacing the previously registered encrypted biometric data with the received encrypted biometric data and storing the secret to be shared.

This object is attained in a sixth aspect of the invention by a trusted network node configured to update previously registered encrypted biometric data of a user of a first client device. The trusted network node comprises a processing unit being configured to receive, from the first client device over a secure communication channel, encrypted biometric data to be used for updating the registered encrypted biometric data and a first authentication token associated with the received encrypted biometric data, which first authentication token comprises a secret to be shared between a second client device and the trusted network node upon the second client device requesting the updated encrypted biometric data, authenticate the received first authentication token, and replace the previously registered encrypted biometric data with the received encrypted biometric data and storing the secret to be shared.

Advantageously, the present invention facilitates updating encrypted biometric data of a user, which biometric data previously has been captured by a first client device and registered at a trusted network node, such as a trusted server.

Hence, the first client device captures biometric data of the user, for instance by utilizing a fingerprint sensing system, or any other appropriate biometric data sensor, such as an iris sensor, retina sensor, face recognition sensor, etc.

The captured biometric data which is to replace the already registered biometric data is here assumed to be of a higher quality than the already registered biometric data.

Thereafter, the first client device encrypts the captured biometric data using a previously generated secret key, which was used in the process of previously registering the encrypted biometric data at the trusted server.

It is noted that in an embodiment, a number of secret keys may previously have been generated, and that the first client device may create a corresponding number of copies of the captured biometric data set, resulting in a corresponding number of updated encrypted biometric data sets to be stored at the trusted server upon replacement of the already stored encrypted biometric data, in order to enable for a corresponding number of second client devices to acquire updated biometric data of the user. However, in the following exemplifying embodiment, it is assumed that a single set of biometric data is encrypted.

Further, the client device creates a first authentication token based on e.g. one or more generated random numbers, which token is associated with the captured biometric data that is to replace the currently registered biometric data and which is configured to be authenticated by the trusted server. For instance, the first authentication token may be signed with a private key of the first client device in case a private-public key pair is used (wherein a corresponding public key is distributed to the trusted server).

The first authentication token is configured to comprise a secret to be shared between a second client device and the trusted server used for authenticating the second client device upon requesting the updated encrypted biometric data set.

The encrypted biometric data, which is to replace the previously registered encrypted biometric data, and the first authentication token are submitted to the trusted server over a secure communication channel being protected in terms of confidentiality and integrity.

Figure 4:
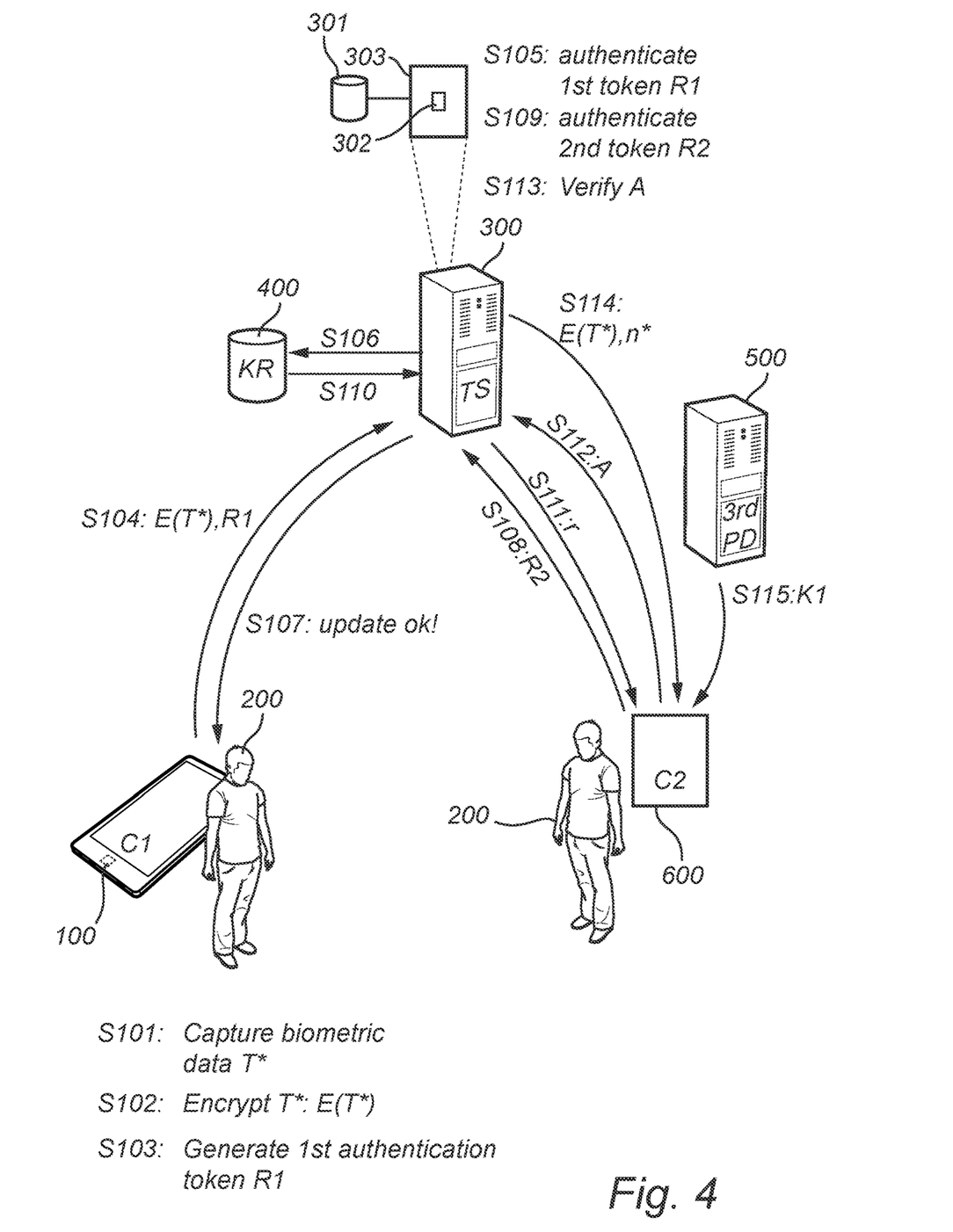
FIG. 4 illustrates an embodiment of the invention of updating encrypted biometric data of a user, the biometric data having been captured by a first client device and registered at a trusted network node, and requesting the updated encrypted biometric data from a second client device.

When receiving the encrypted biometric data and the first authentication token, the trusted server authenticates the first authentication token, for example using the previously mentioned public key of the first client device to verify the digital signature provided by the first client device to the first authentication token. If the authentication fails, the process is terminated and no biometric data update is performed by the trusted server 300 (FIG. 4).

Upon successful authentication, the trusted server replaces the previously registered encrypted biometric data stored in a secure key repository located at, or remote from, the trusted server with the new encrypted biometric data. Further, the new shared secret of the first authentication token associated with the updated encrypted biometric data is stored in the key repository.

It should however be noted that the previously stored shared secret associated with the encrypted biometric data that is replaced must be kept in storage until a second client device requesting the updated encrypted biometric data has been authenticated and thus provided with the updated encrypted biometric data and the new shared secret associated with the updated encrypted biometric data.

Advantageously, a secure biometric data transfer method and arrangement using a trusted server that stores encrypted end-user biometric data on behalf of the user without having direct access to original templates is provided. Further advantageous is that the invention facilitates efficient and secure updating of the biometric data.

In an embodiment, the trusted server is further configured to receive a request from the second client device over a secure communication channel to receive the updated encrypted biometric data which has replaced previously registered encrypted biometric data of the user, the request comprising a second authentication token associated with the previously registered encrypted biometric data, and to authenticate the received second authentication token. The trusted server is further configured to acquire the updated encrypted biometric data, the secret to be shared with the second client device, and a shared secret associated with the encrypted biometric data that has been replaced, from the key repository, submit an authentication challenge to the second client device, receive an authentication response based on the shared secret associated with the encrypted biometric data that has been replaced and the authentication challenge, verify that the authentication response has been correctly computed, and if so submit the updated encrypted biometric data and the secret to be shared to the second client device.

Now, when the second client device wishes to acquire the updated encrypted biometric data of the user, the second client device submits a request accordingly to the trusted server over a secure communication channel, which request comprises a second authentication token associated with the previously registered encrypted biometric data.

The trusted server authenticates the second authentication token, using e.g. a private key of the trusted server corresponding to a public key used by the first client device—the first client device being the device that originally created the second authentication token.

Upon successful authentication, the trusted server fetches, from the key repository, the updated encrypted biometric data and further the shared secret that was stored with the previously registered encrypted biometric data that now has been updated.

Further, the trusted server fetches the new secret that was comprised in the first authentication token, which new secret needs to be shared between the second client device and the trusted server in order to authenticate the second client device upon the second client device requesting an updated encrypted biometric data set in the future.

The old shared secret has been received earlier by the second client device from the trusted server upon the second client device acquiring the previously registered encrypted biometric data.

The trusted server submits an authentication challenge to the second client device 600, whereupon the second client device uses the previously acquired shared secret in combination with the received authentication challenge to compute an authentication response, and sends the authentication response to the trusted server.

If the trusted server verifies that the authentication response has been correctly computed based on the "old" shared secret acquired from the key repository and the authentication challenge r, the trusted server submits the updated encrypted biometric data to the second client device, along with the new shared secret that was comprised in the first authentication token, and which will be used the next time the second client device requests a further updated encrypted biometric data set from the trusted server.

Hence, the old shared secret associated with the previously registered encrypted biometric data need not be stored in the key repository any longer.

Finally, in an embodiment, the second client device decrypts the updated encrypted biometric data using the previously generated secret key, which initially was used by the first client device to encrypt the biometric data, in order to obtain the updated biometric data in the clear.

In this embodiment, the secret key is received from a third party server with which the user of the second client device is to be authenticated. The third party server has in its turn received the key from the first client device over a secure channel.

In a further embodiment, the clear-text updated biometric data of the user is securely stored at the second client device in a protected volatile or non-volatile memory to subsequently be used to authenticate the user whom should be granted access, via the second client device, to a service provided by a third party server.

Further embodiments of the invention will be described in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
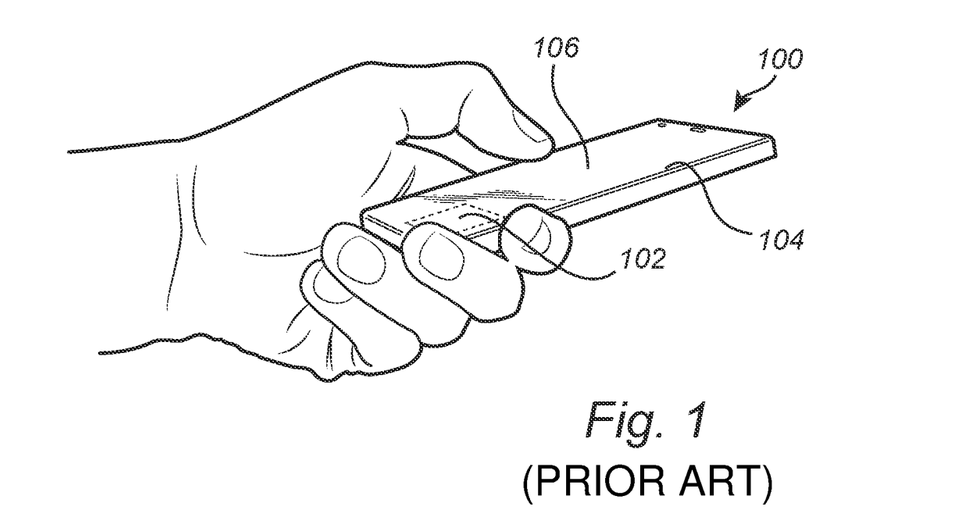
FIG. 1 shows a client device in the form of a smart phone in which the present invention may be implemented.

FIG. 1 shows a client device 100 in the form of a smart phone in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or any other type of present or future similarly configured device utilizing fingerprint sensing.

Figure 2:
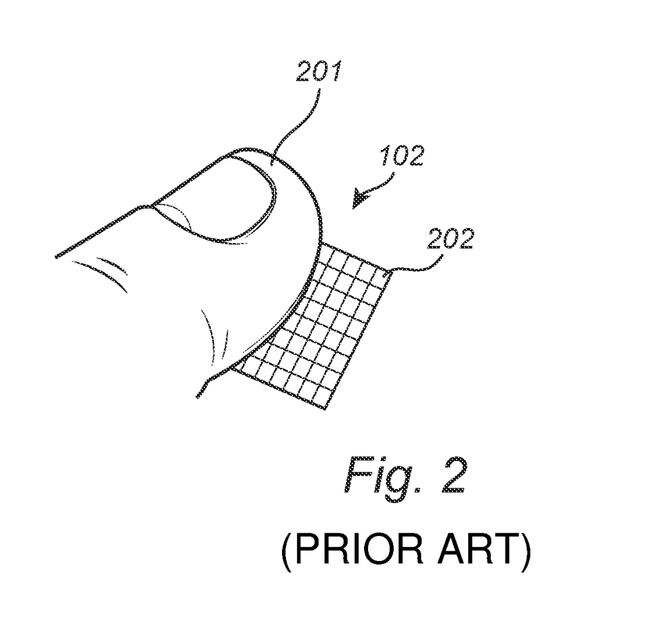
FIG. 2 shows a view of a fingerprint sensor onto which a user places her finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
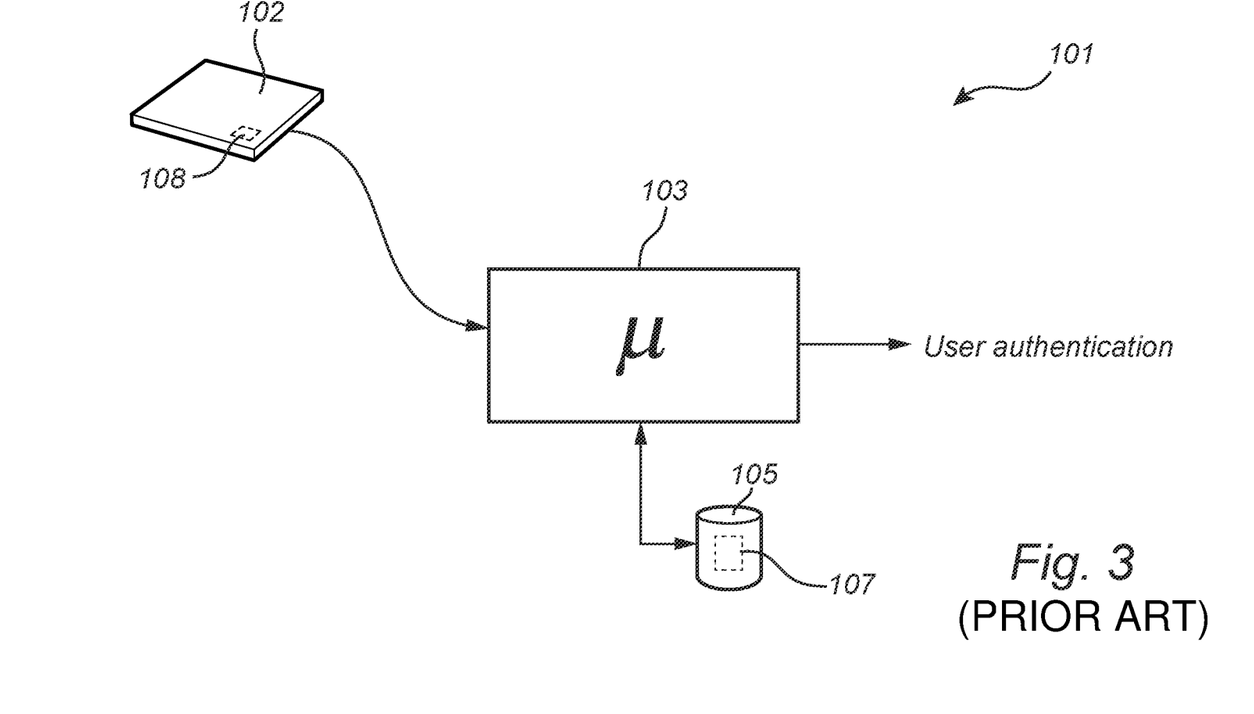
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random access memory (RAM) may be embedded in the sensor die.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 (apart from capturing the image, which is carried out by the sensor 102) are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

It is noted that other biometric sensors 102 may be used, such as iris sensors, retina sensors, face recognition sensors, etc., for deriving biometric data of the user.

FIG. 4 illustrates an embodiment of the invention of updating encrypted biometric data of a user 200, which biometric data previously has been captured by a first client device 100 and registered at a trusted network node 300, in this case embodied by the trusted server 300.

It should be noted that the embodiment described with reference to FIG. 4 assumes that encrypted biometric data to be updated already has been registered at the trusted network node 300 using an adequate and secure process. The description of the embodiment of FIG. 4 will not discuss the process of how the encrypted biometric data previously was registered with the trusted node 300.

However, for completeness, an example of such a process will subsequently be described with reference to FIGS. 5 and 6.

In a first step S101, the first client device 100 captures biometric data T* of the user 200, for instance by utilizing a fingerprint sensing system 101 as described with reference to FIGS. 1-3.

The captured biometric data T* which is to replace the already registered biometric data (denoted T) is here assumed to be of a higher quality than the already registered biometric data T.

Thereafter, in step S102, the first client device 100 encrypts the captured biometric data T* using a previously generated secret key K1, which was used in the process of registering the encrypted biometric data E(T) at the trusted server 300, resulting in the encrypted biometric data E(T*).

It is noted that a number of secret keys K previously may have been generated, and that the first client device 100 may create a corresponding number of copies of the captured biometric data set T*, resulting in i updated encrypted biometric data sets E(T*) to be stored at the trusted server 300 upon replacement of the already stored encrypted biometric data E(T), in order to enable for a corresponding number of second client devices 600 to acquired updated biometric data of the user 200. However, in the following exemplifying embodiment, it is assumed that a single set of biometric data T* is encrypted.

Further, the client device 100 creates a first authentication token R1 in step S103 based on e.g. one or more generated random numbers, which token R1 is associated with the captured biometric data T* that is to replace the currently registered biometric data and which is configured to be authenticated by the trusted network node 300. For instance, the first authentication token R1 may be encrypted with a symmetric key held by both the first client device 100 and the trusted server 300, or with a private key of the first client device 100 in case a private-public key pair is used.

The first authentication token R1 is configured to comprise a secret n* to be shared between the second client device 600 and the trusted server 300 used for authenticating the second client device 600 upon requesting the updated encrypted biometric data set E(T*).

In case a private-public key pair is used, a public key $Pk_c$ of the first client device 100 has previously been submitted along with the generated one or more shared secrets to the trusted server 300 upon previously registering encrypted biometric data which now is to be updated. The public key $Pk_c$ of the first client device 100 will be used subsequently by the trusted server 300 to verify a digital signature provided by the first client device 100 to the first authentication token R1 using its corresponding private key $Pr_c$.

In step S104, the encrypted biometric data E(T*) and the first authentication token R1 are submitted to the trusted server 300 over a secure communication channel; i.e. a communication channel being protected in terms of confidentiality and integrity.

When receiving the encrypted biometric data E(T*) and the first authentication token R1 in step S104, the trusted server 300 authenticates the first authentication token in step S105, for example using the previously received public key $Pk_c$ of the first client device 100 to verify the digital signature provided by the first client device 100 to the first authentication token R1. If the authentication fails, the process is terminated and no biometric data update is performed by the trusted server 300.

Upon successful authentication in step S105, the trusted server 300 replaces in step S106 the previously registered encrypted biometric data E(T) stored in a secure key repository 400 located at, or remote from, the trusted server 300 with the new encrypted biometric data E(T*). Further, the new shared secret n* of the first authentication token R1 associated with the updated encrypted biometric data E(T*) is stored in the key repository 400.

It should however be noted that the previously stored shared secret n associated with the encrypted biometric data E(T) that is replaced must be kept in storage until a second client device 600 requesting the updated encrypted biometric data E(T*) has been authenticated and thus provided with the updated encrypted biometric data E(T*) and the new shared secret n* associated with the updated encrypted biometric data E(T*).

Thereafter, the trusted server 300 may optionally submit a message to the first client device 100 in step S107 confirming that the encrypted biometric data has been successfully updated. Alternatively, the first client device 100 may optionally in step S107 check that the encrypted biometric data has been successfully updated at the trusted server 300.

Now, when a second client device 600 wishes to acquire the updated encrypted biometric data E(T*) of the user 200, the second client device 600 submits a request accordingly to the trusted server 300 in step S108 over a secure communication channel, which request comprises a second authentication token R2 associated with the previously registered encrypted biometric data E(T).

The trusted server 300 authenticates the second authentication token R2 in step S109, using e.g. a symmetric key shared with the first client device 100 or a private key of the trusted server 300 corresponding to a public key used by the first client device 100—the first client device 100 being the device that originally created the second authentication token R2. As will be described in further detail subsequently, in case a private-public key pair is used, both the public key of the trusted server 300 and the private key of the first client device 100 are used to respectively encrypt and sign the second authentication token R2.

Upon successful authentication, the trusted server 300 fetches, from the key repository 400, the updated encrypted biometric data E(T*) in step S110 and further the shared secret n that was stored with the previously registered encrypted biometric data E(T) that now has been updated.

Further, the trusted server fetches the new secret n* that was comprised in the first authentication token R1, which new secret needs to be shared between the second client device 600 and the trusted server 300 in order to authenticate the second client device 600 upon the second client device 600 requesting an updated encrypted biometric data set in the future.

The old shared secret n has been received earlier by the second client device 600 from the trusted server 300 upon the second client device 600 acquiring the previously registered encrypted biometric data E(T).

In step S111, the trusted server 300 submits an authentication challenge r to the second client device 600.

Now, the second client device 600 uses the previously acquired shared secret n in combination with the received authentication challenge r to compute an authentication response A in step S112 and sends the authentication response A to the trusted server 300.

If the trusted server 300 verifies in step S113 that the authentication response A has been correctly computed based on the old shared secret n acquired from the key repository 400 in step S110 and the authentication challenge r, the trusted server 300 submits the updated encrypted biometric data E(T*) to the second client device 600 in step S114, along with the new shared secret n* that was comprised in the first authentication token R1, and which will be used the next time the second client device 600 requests a further updated encrypted biometric data set from the trusted server 300.

Hence, the shared secret n associated with the previously registered encrypted biometric data need not be stored in the key repository any longer.

Finally, the second client device 600 can decrypt the updated encrypted biometric data E(T*) using the previously generated secret key K1—which initially was used by the first client device 100 to encrypt the biometric data—to obtain the updated biometric data T* in the clear.

As is illustrated in FIG. 4, the secret key K1 is received in step S115 from a third party server 500 with which the user 200 of the second client device is to be authenticated. The third party server 500 has in its turn received the key K1 from the first client device 300.

The clear-text updated biometric data T* of the user 200 is typically securely stored at the second client device 600 in a protected volatile or non-volatile memory to subsequently be used to authenticate the user 200 whom should be granted access, via the second client device 600, to a service provided by a third party server 500.

Assuming, for instance, that the user 200 subscribes to a service provided by the third party server 500, such as an e-commerce service with which the user 200 authenticates herself using fingerprint data instead of a Personal Identification Number (PIN) to effect a payment of goods bought via the e-commerce service, the described embodiment advantageously enables authentication of the user 200 at a second client device 600 for accessing the e-commerce service provided by the third party server 500.

In another example, the third party server 500 belongs to a service provider such as a car rental company and the second client device 600 could be embodied in the form of a car key device with a fingerprint reader. When used for this application, the invention allows the car rental company to handle its customers completely online and having car keys available to customers also at unsafe places (out of office hours and at remote locations) without having a high risk of cars being stolen as car keys only can be activated by a user who actually has ordered and paid for a particular car. The user can trust the system as it ensures that the biometric data of the user —even if the biometric data is transferred to the car rental company—never will be available to the car rental company outside the car key device, which can be assumed to be secure (and its trustworthiness can be explicitly verified by the trusted server 300 in the system prior to transferring a decryption key to the car key device needed to decrypt a piece of encrypted biometric data of the user).

With further reference to FIG. 4, the steps of the method performed by the trusted server 300 are in practice performed by a processing unit 301 embodied in the form of one or more microprocessors arranged to execute a computer program 302 downloaded to a storage medium 303 associated with the microprocessor, such as a Random Access Memory (RAM), a Flash memory or a hard disk drive. The processing unit 301 is arranged to cause the trusted server 300 to carry out the method according to embodiments when the appropriate computer program 302 comprising computer-executable instructions is downloaded to the storage medium 303 and executed by the processing unit 301. The storage medium 303 may also be a computer program product comprising the computer program 302. Alternatively, the computer program 302 may be transferred to the storage medium 303 by means of a suitable computer program product, such as a Digital Versatile Disc (DVD) or a memory stick. As a further alternative, the computer program 302 may be downloaded to the storage medium 303 over a network. The processing unit 301 may alternatively be embodied in the form of a digital signal processor (DSP), an application specific integrated circuit (ASIC), a field-programmable gate array (FPGA), a complex programmable logic device (CPLD), etc.

As previously mentioned, the updating of encrypted biometric data set out in FIG. 4 assumes that encrypted biometric data E(T) initially has been registered at the trusted server 300.

Figure 5:
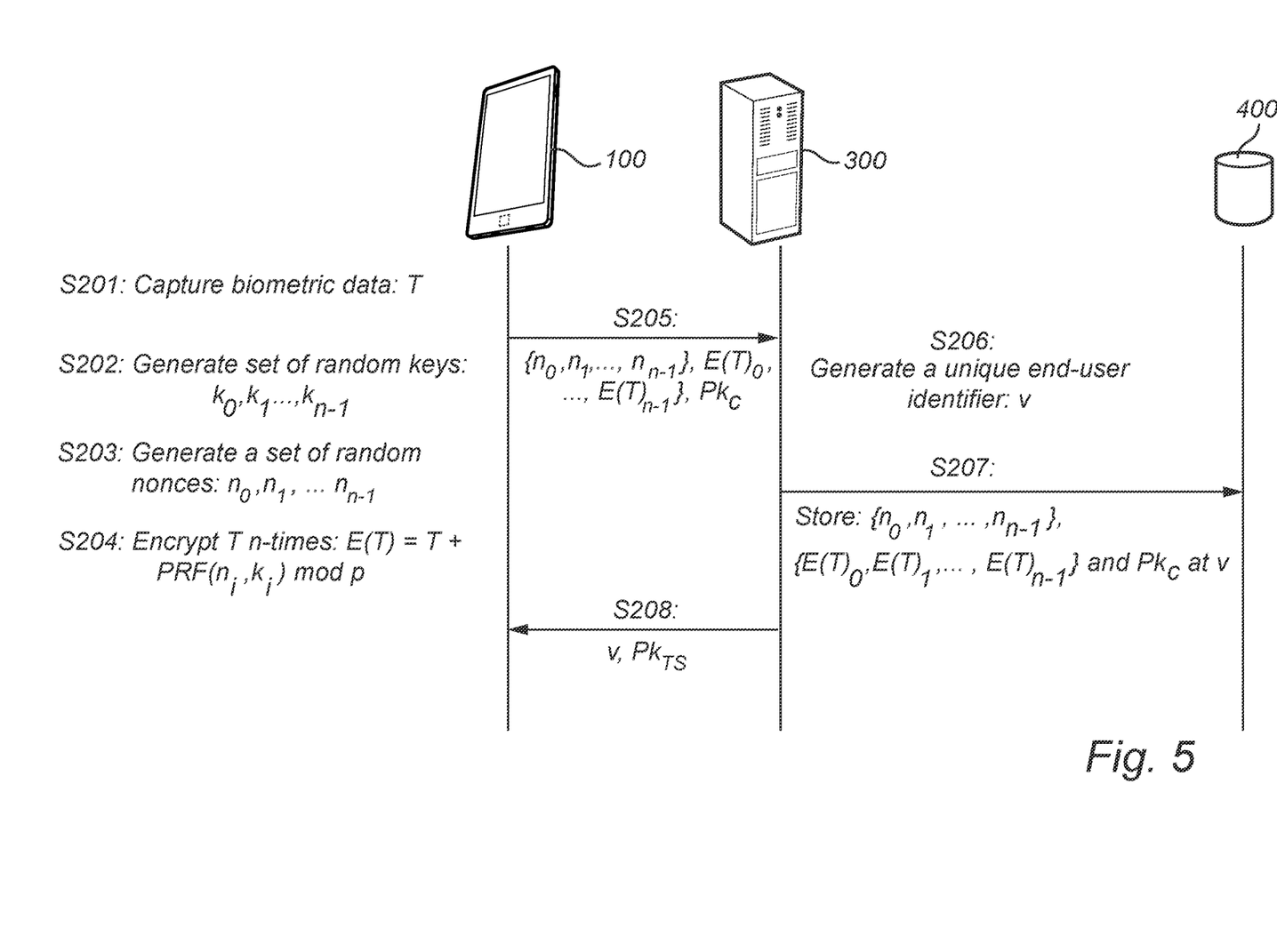
FIG. 5 illustrates an embodiment of the invention of initially registering encrypted biometric data with the trusted network node.

FIG. 5 will describe an example of such a process of registering encrypted biometric data at the trusted server 300.

In step S201, the first client device 100 captures biometric data T of the user 200.

In step S202, the first client device 100 generates at least one secret biometric data protection key K1 subsequently used for encrypting biometric data of the user 200 which is captured by the first client device 100.

The secret key K1 is subsequently acquired by the second client device 600 for decrypting encrypted biometric data of the user 200. Hence, a number of secret keys may be generated in step S101 by the first device 100, in order to enable for a corresponding number of second client devices to decrypt encrypted biometric data of the user 200.

In this particular exemplifying embodiment, a batch of n one-time secret biometric data protection keys: $k_0, k_1, \ldots, k_{n-1}$ is generated using e.g. a Random Number Generator (RNG). These keys are also stored by the first client device 100 in a suitable secure non-volatile memory together with any status information.

In step S203, the first client device 100 generates a batch of n one-time random nonces: $n_0, n_1, \ldots, n_{n-1}$ again using an RNG. As previously has been discussed, these nonces are subsequently used as shared secrets between the trusted server 300 and the second client device(s) 600 in order to authenticate the second client device 600 at the trusted server 300 for receiving updated encrypted biometric data registered with the trusted server 300.

In step S204, the first client device 100 uses the generated keys to produce n encrypted biometric data sets: $E(T)_0, E(T)_1, \ldots, E(T)_{n-1}$.

It is noted that the invention is not limited to any particular one-time encryption method but according to one embodiment the encryption is chosen as a simple modulo addition: $E(T)_i = T + PRF(n_i, k_i) \mod p$, where p is an integer representing the size of the template T and PRF is a suitable Pseudo Random Function, i.e., a block cipher running in electronic code book form. According to an alternative, the encryption is performed as a one-time pad modulo two addition: $E(T)_i = T\ PRF(n_i, k_i)$.

In step 205, the first client device 100 sends the generated batch of one-time random nonces $\{n_0, n_1, \ldots, n_{n-1}\}$ and encrypted biometric data $\{E(T)_0, E(T)_1, \ldots, E(T)_{n-1}\}$ to the trusted server 300 over a secure communication channel.

In case a private-public key pair is used, a public key $Pk_c$ of the first client device 100 is also submitted. The public key $Pk_c$ of the first client device 100 will be used subsequently by the trusted server 300 to verify a digital signature provided by the first client device 100 using its corresponding private key.

Upon receiving the nonces $\{n_0, n_1, \ldots, n_{n-1}\}$ and encrypted biometric data $\{E(T)_0, E(T)_1, \ldots, E(T)_{n-1}\}$, the trusted server 300 associates the data with a unique identifier v in step S206 and stores in S207 the received nonces and sets of encrypted biometric data along with the public key $Pk_c$ of the first client device 100 along with the identifier v in the secure key repository 400, possibly along with any appropriate user or client device data.

Finally, in step S208, the trusted server submits the identifier v to the first client device 100 along with a public key $Pk_{TS}$ of the trusted server 300. The public key $Pk_{TS}$ of the trusted server 300 will be used by the first client device 100 to create an encrypted authentication token that the trusted server 300 subsequently is capable of decrypting (i.e. the second authentication token R2 previously discussed with reference to FIG. 4).

The identifier v and the public key $Pk_{TS}$ are stored by the first client device 100 in secure internal memory to be used subsequently once the first client device 100 decides to share protected biometric data of the user 200 with a third party domain, as will be discussed in the following.

Figure 6:
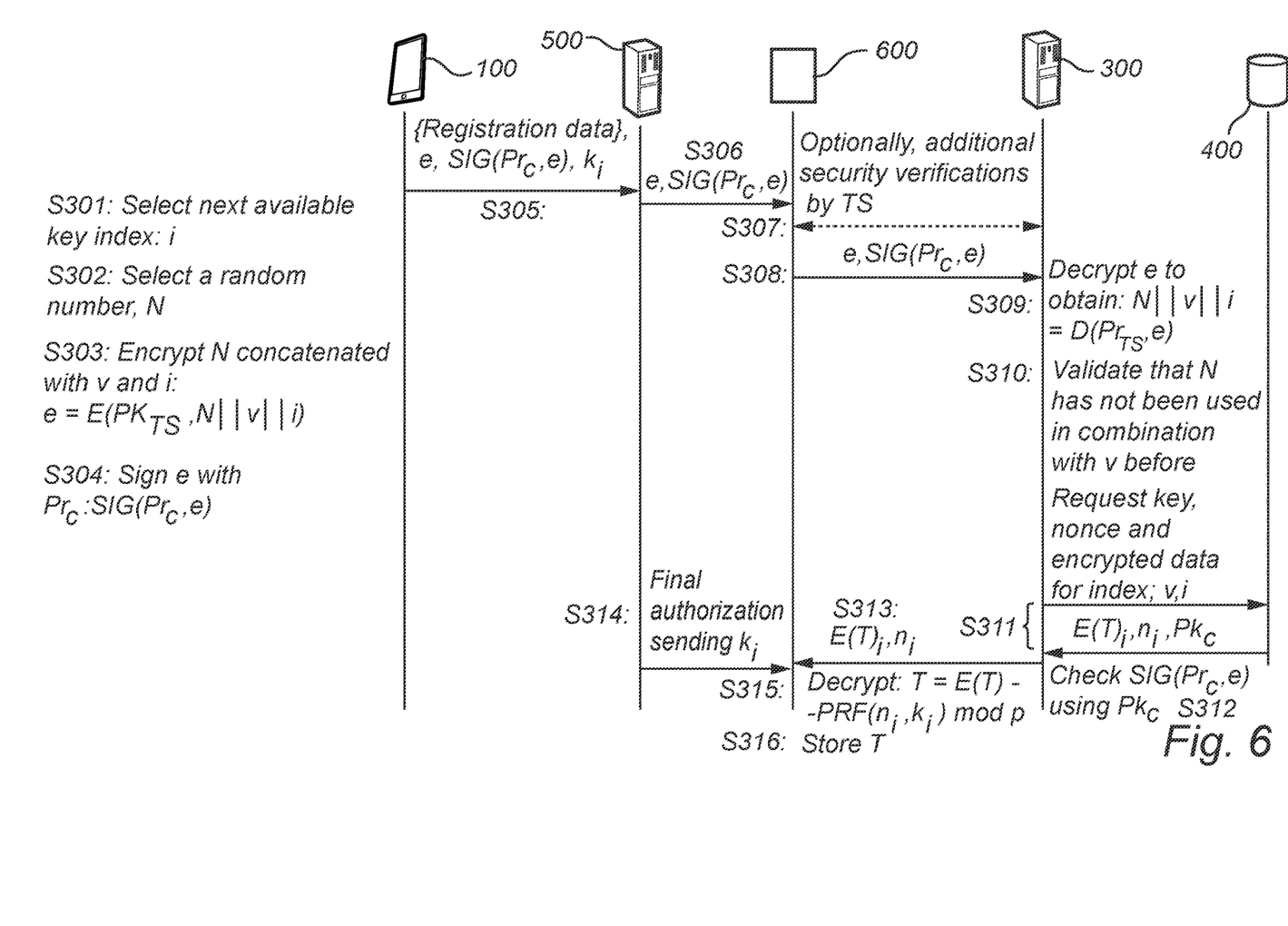
FIG. 6 illustrates an embodiment of the invention of initially requesting, from a client device, encrypted biometric data stored with the trusted network node.

FIG. 6 will describe an example of a process of having the second client device 600 requesting—and receiving—registered encrypted biometric data from the trusted server 300.

In step S301, the first client device 100 selects one of the (not previously used) encrypted biometric data sets $\{E(T)_0, E(T)_1, \ldots, E(T)_{n-1}\}$ that was previously registered with the trusted server 300—it is assumed that the next available set with index i, is selected.

As previously has been described with reference to FIG. 4, a second authentication token R2 is created by the first client device 100.

In this particular example, the authentication token R2 is created in step S302 by using an RNG to generate a further random number N of suitable length. It is noted that a number of different approaches for generating the second authentication token can be envisaged.

Thereafter, in step S303, the client device 100 uses the previously received public key $Pk_{TS}$ of the trusted server 300 to encrypt the generated further random number N concatenated with the index i and the identifier v which the trusted server 300 previously associated with the generated batch of encrypted biometric data sets in step S107 of FIG. 5: $e = E(Pk_{TS}, N\|i\|v)$. Hence, in order to create R2, a data set comprising a combination of the random number N, the index i and the identifier v is encrypted with the public key of the trusted server 300.

In step S304, the first client device 100 uses its private key $Pr_c$ to sign e in order to obtain a signed and encrypted second authentication token that refers to the selected secret one-time encrypted biometric data $E(T)_i$: $SIG(Pr_c, e)$. Additional data may be included in this signature, for instance a unique ID of the third party server 500.

The authentication token R2 is thus composed of $SIG(Pr_c, e)$, e and is submitted to the third party server 500 in step S305 over a secure communication channel along with the key $k_i$ with which this particular set of encrypted biometric data $E(T)_i$ originally was encrypted by the first client device 100, thereby enabling authentication of the user 200 at another client device 600 for accessing services provided by the third party server 500 as will be described in the following.

The third party server 500 decides which other client devices that potentially need to identify the user 200 by means of biometric data. To these client devices, the third party server 500 sends the second authentication token R2: e, $SIG(Pr_c, e)$ in step S306, preferably over a secure channel.

These "other client devices" are for simplicity exemplified by the second client device 600. However, as was illustrated in step s201 of FIG. 5, a number of "other devices" corresponding to the number of encrypted biometric data sets $\{E(T)_0, E(T)_1, \ldots, E(T)_{n-1}\}$ registered with the trusted server 300 can be envisaged.

The second client device 600 establishes a secure channel with the trusted server 300.

Optionally, prior to processing any request from the second client device 600 to attain an encrypted biometric data set, the trusted server 300 performs one or more security checks in step S307 to verify security status of the second client device 600 and a secure execution environment of the second client device 600 in which any sensitive data is processed. Hence, the trusted server 300 checks in step S307 whether the second client device 600 belongs to a set of trusted devices. The invention is not limited to any particular type of security checks, but they may for instance include integrity verification of the secure execution environment implemented on the biometric sensor of the client device 600 using for instance Trusted Computing technologies assuming the biometric sensor has Trusted Platform Module (TPM) support, or verification of the trust status of the biometric sensor based on credentials of the biometric sensor used for the secure channel establishment, and so forth.

Thereafter, in step S308, the second client device 600 submits the second authentication token R2, i.e. e, $SIG(Pr_c, e)$, to the trusted server 300.

Upon receiving e and $SIG(Pr_c, e)$, the trusted server 300 uses its private key $Pr_{TS}$ to decrypt e in step S309, which is denoted $D(Pr_{TS}, e) = N\|i\|v$, thereby authenticating the second authentication token R2.

Now, if the decryption at step S309 succeeds, the second client device 600 is considered to be a trusted device, and the trusted server 300 may optionally verify in step S310 that the further random number N has not been used together with the identifier v before (by for instance maintaining an internal index cache memory with used nonce values). If it has been used before, the procedure is aborted with an error message to the second client device 600.

However, it is here assumed that the further random number N has not been previously used, and the trusted server 300 turns to the key repository 400 in step S311 for acquiring the encrypted biometric data $E(T)_i$ and the nonce $n_i$ associated with the selected index i and the identifier v, along with the public key $Pk_c$ of the first client device 100 that initially registered the encrypted biometric data with the trusted server 300, if the second authentication token R2 was digitally signed at the first client device 100 (which it in this example was).

Thus, in step S312, to further strengthen the process of authenticating the authentication token R2, the trusted server 300 uses the public key $Pk_c$ of the first client device 100 that initially registered the encrypted biometric data with the trusted server 300 to further verify the second authentication token, by verifying the digital signature $SIG(Pr_c, e)$. Advantageously, by verifying the digital signature:

authentication is provided, i.e., the signed message was created by a known sender;

non-repudiation is provided, i.e., the sender cannot deny having sent the signed message; and integrity is provided, i.e., the signed message was not altered in transit.

If the verification should fail, the authentication is typically aborted, and an error message is sent accordingly to the second client device 600.

In step S313, the trusted server 300 submits the encrypted biometric data $E(T)_i$ and the nonce $n_i$ over the secure channel to the second client device 600, thus advantageously making the nonce $n_i$ a shared secret between the second client device 600 and the trusted server 300.

Once the third party server 500 decides or knows exactly which second client devices that should be allowed access to the registered encrypted biometric data (which might happen at a much later occasion in time), it sends the one-time biometric data protection key k over a secure channel to the second client device 600 over the secure channel in step S314.

In step S315, the second client device 600 uses the received secret one-time biometric data template key k and the shared secret $n_i$ to decrypt the received encrypted template $E(T)_i$ to obtain the biometric data T in the clear.

If the previously described modulus encryption option is used, the encrypted biometric data is decrypted as: $T = E(T)_i - PRF(n_i, k_i) \mod p$.

At this stage, an authentication procedure may take place by comparing the biometric data T with biometric data T' captured at the second client device 600. However, in this particular example, the clear-text biometric data T of the user 200 is securely stored in step S316 at the second client device 600 in a protected volatile or non-volatile memory to subsequently be used to authenticate the user 200 whom should be granted access, via the second client device 600, to a service provided by the third party server 500.

Figure 7:
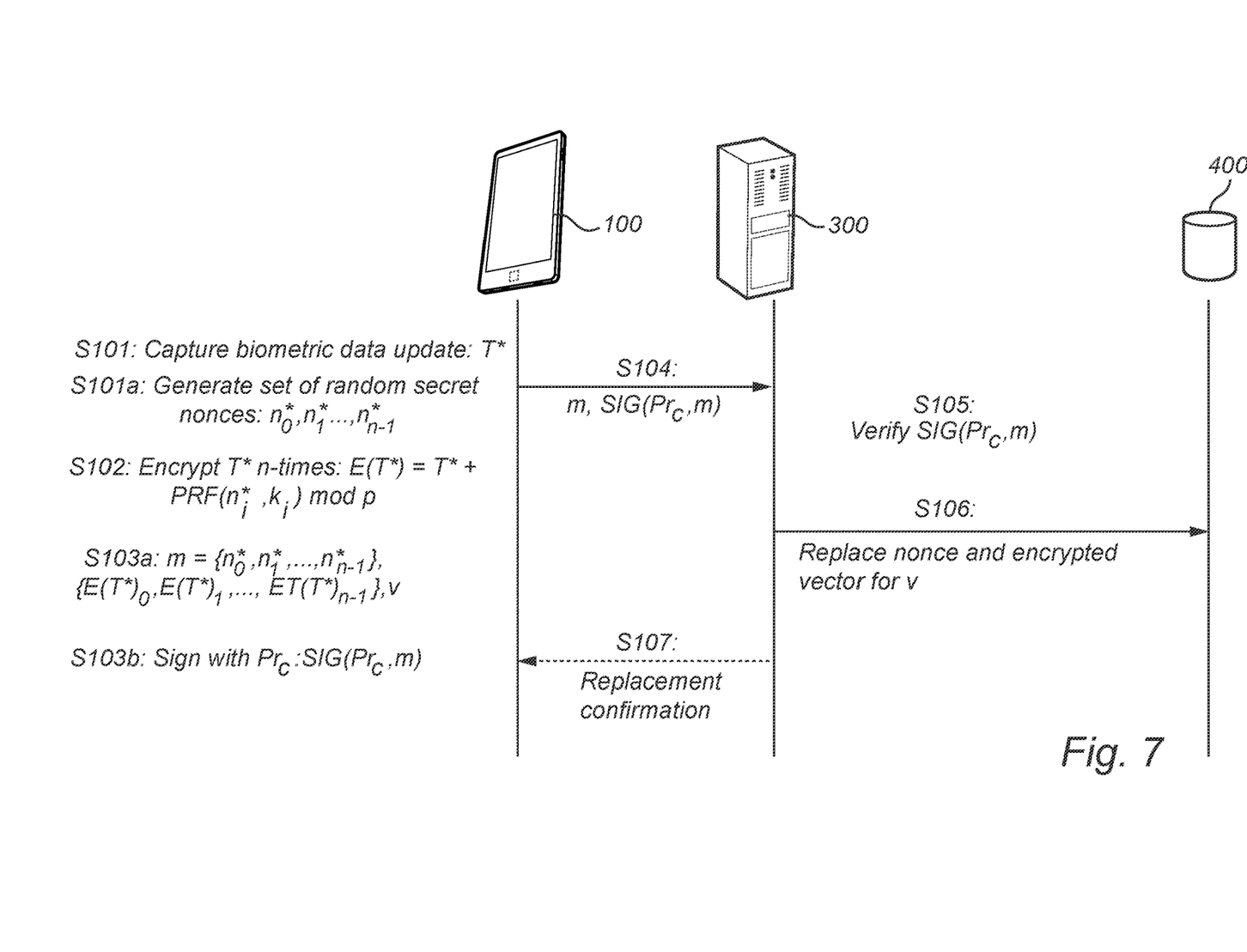
FIG. 7 illustrates yet another embodiment of the invention of updating encrypted biometric data of a user having been captured by a first client device and registered at a trusted network node.
Figure 8:
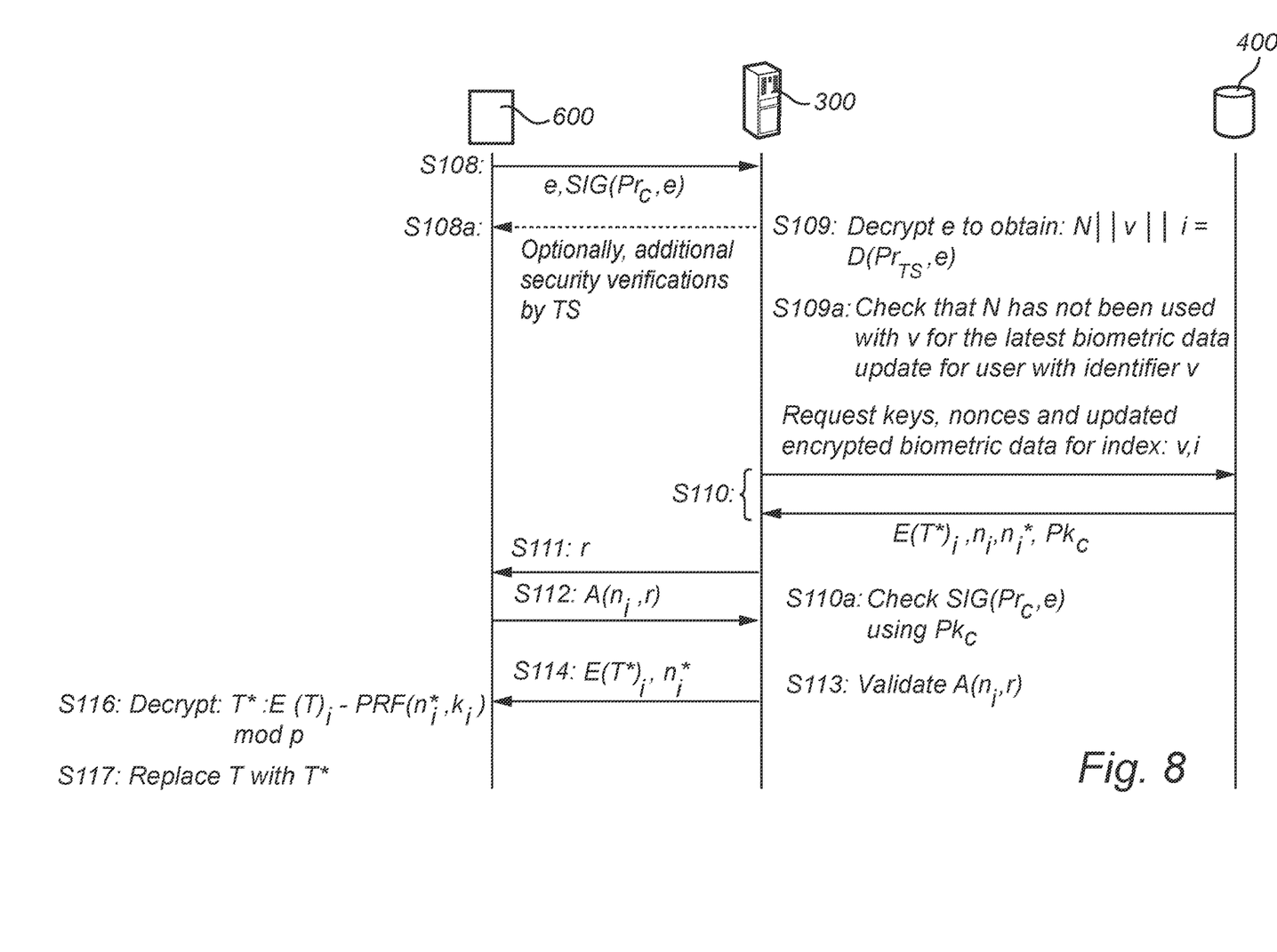
FIG. 8 illustrates yet another embodiment of the invention of requesting, from a second client device, updated encrypted biometric data held at a trusted network node.

FIGS. 7 and 8 illustrate more detailed embodiments of updating encrypted biometric data of a user 200 at the trusted server 300 and of requesting updated encrypted biometric data as previously described with reference to FIG. 4.

FIG. 7 illustrates the process of having the first client device 100 update the biometric data previously registered with the trusted server 300, while FIG. 8 illustrates the process of having the second client device 100 request the updated biometric data from the trusted server.

With reference to FIG. 7, in a first step S101, the first client device 100 captures biometric data T* of the user 200, for instance by utilizing a fingerprint sensing system 101 as described with reference to FIGS. 1-3. This captured biometric data is considered to be of a higher quality than a currently registered encrypted biometric data set, and should therefore replace the encrypted biometric data registered at the trusted server 300

Thereafter, like in step S203 of FIG. 5, the first client device 100 generates a batch of n one-time random nonces: $n_0^*, n_1^*, \ldots, n_{n-1}^*$ in step S101a using an RNG. As previously has been discussed, these nonces are subsequently used as shared secrets between the trusted server 300 and the second client device(s) 600 in order to authenticate the second client device 600 at the trusted server 300 for receiving updated encrypted biometric data registered with the trusted server 300.

It should here be noted that a shared secret for an immediately preceding registered encrypted biometric data set is used when authenticating the request for an updated encrypted biometric data set of the second client device 600 at the trusted server 300.

In step S102, the first client device 100 uses the previously generated keys $k_i$, and optionally the nonces $n_i^*$ generated in step S101a, to produce a number n of encrypted biometric data sets: $E(T^*)_0, E(T^*)_1, \ldots, E(T^*)_{n-1}$.

It is noted that the invention is not limited to any particular one-time encryption method but according to one embodiment the encryption is chosen as a simple modulo addition: $E(T^*)_i = T^* + PRF(n_i^*, k_i) \mod p$, where p is an integer representing the size of the template T* and PRF is a suitable Pseudo Random Function, i.e., a block cipher running in electronic code book form. According to an alternative, the encryption is performed as a one-time pad modulo two addition: $E(T^*)_i = T^* \oplus PRF(n_i^*, k_i)$.

Thereafter, the first client device 100 creates the first authentication token R1 in step S103, in this particular embodiment by creating a key update message m in step S103a comprising the created nonces, the encrypted biometric data sets and the identifier v indicating the encrypted biometric data set to be replaced in the key repository 400 by the trusted server 300: $m = \{n_0^*, n_1^*, \ldots, n_{n-1}^*\}, \{E(T^*)_0, E(T^*)_1, \ldots, E(T^*)_{n-1}\}, v$.

Further, the first client device 100 uses its private key $Pr_c$ to sign m in order to obtain a signed first authentication token. The first authentication token R1 is thus composed of m, $SIG(Pr_c, m)$.

In step S104, the first authentication token R1=m, $SIG(Pr_c, m)$, which in this embodiment comprises the encrypted biometric data E(T*) (in fact a number of encrypted biometric data sets), is submitted to the trusted server 300 over a secure communication channel; i.e. a communication channel being protected in terms of confidentiality and integrity When receiving the first authentication token R1=m, $SIG(Pr_c, m)$, the trusted server 300 uses the identifier v to look-up the public key $Pk_c$ of the first client device 100 in the key repository 400 to verify the first authentication token R1 in step S105.

Upon successful verification of the first authentication token R1, the trusted server 300 replaces the currently registered encrypted biometric data set(s) for identifier v with the updated encrypted biometric data sets $\{E(T^*)_0, E(T^*)_1, \ldots, E(T^*)_{n-1}\}$ and stores corresponding random nonces $\{n_0^*, n_1^*, \ldots, n_{n-1}^*\}$, which random nonces subsequently will constitute shared secrets between the second client device 600 and the trusted server 300.

It should however be noted that the previously stored shared secrets $n_i$ associated with the encrypted biometric data that was replaced must be kept in storage until a second client device 600 requesting an updated encrypted biometric data E(T*) has been authenticated and thus provided with the updated encrypted biometric data E(T*).

Thereafter, the trusted server submits a message to the first client device 100 in step S107 confirming that the encrypted biometric data has been successfully updated.

With reference to FIG. 8, in a first step S108, when a second client device 600 wishes to acquire the updated encrypted biometric data E(T*) of the user 200, the second client device 600 submits a request accordingly to the trusted server 300 over a secure communication channel, which request comprises the second authentication token R2 associated with the previously registered encrypted biometric data E(T).

Optionally, in an embodiment, prior to processing any request from the second client device 600 to attain an encrypted biometric data set, the trusted server 300 performs one or more security checks in step S108a to verify security status of the second client device 600 and a secure execution environment of the second client device 600 in which any sensitive data is processed. Hence, the trusted server 300 checks in step S108a whether the second client device 600 belongs to a set of trusted devices. The invention is not limited to any particular type of security checks, but they may for instance include integrity verification of the secure execution environment implemented on the biometric sensor of the client device 600 using for instance Trusted Computing technologies assuming the biometric sensor has Trusted Platform Module (TPM) support, or verification of the trust status of the biometric sensor based on credentials of the biometric sensor used for the secure channel establishment, and so forth.

In this particular exemplifying embodiment, the second authentication token R2 is composed of e, $SIG(Pr_c, e)$, as created by the first client device 100 described in step S304 of FIG. 6.

Upon receiving e and $SIG(Pr_c, e)$, the trusted server 300 uses its private key $Pr_{TS}$ to decrypt e in step S109, which is denoted $D(Pr_{TS}, e) = Kip$, thereby authenticating the second authentication token R2.

Now, in case the second authentication token R2 is successfully authenticated, and the second client device 600 is considered to be a trusted device, the trusted server 300 may optionally verify in step S109a that the further random number N has not been used together with the identifier v before (other than for the encrypted biometric data that has been replaced).

The trusted server 300 turns to the key repository 400 in step S110 for acquiring the updated encrypted biometric data $E(T^*)_i$ and the new nonce $n_i^*$ associated with the selected index i and the identifier v for the updated encrypted biometric data $E(T^*)_i$, along with the public key $Pk_c$ of the first client device 100 that initially registered the encrypted biometric data with the trusted server 300, since the second authentication token R2 was digitally signed at the first client device.

Further, the nonce(s) $n_i$ associated with the previously registered encrypted biometric data that now has been replaced—i.e. the secret(s) shared between the trusted server 300 and the second client device 600—is acquired from the key repository 400 in step S110.

In step S110a, to further strengthen the process of authenticating the authentication token R2, the trusted server 300 uses the public key $Pk_c$ of the first client device 100 to further verify the second authentication token, by verifying the digital signature $SIG(Pr_c, e)$.

If the verification should fail, the authentication is typically aborted, and an error message is sent accordingly to the second client device 600.

In step S111, the trusted server 300 submits an authentication challenge r to the second client device 600.

Now, the second client device 600 uses the previously acquired shared secret n associated with the previously registered encrypted biometric template E(T) which has now been updated, in combination with the received authentication challenge r, to compute an authentication response A in step S112 and sends the authentication response A to the trusted server 300.

If the trusted server 300 verifies in step S113 that the authentication response A has been correctly computed based on the previously shared secret n acquired from the key repository 400 in step S110 and the authentication challenge r, the trusted server 300 submits the updated encrypted biometric data $E(T^*)_i$ to the second client device 600 in step S114, along with the new shared secret n* that was comprised in the first authentication token R1, and which will be used the next time the second client device 600 requests yet a further updated encrypted biometric data set from the trusted server 300.

Hence, the shared secret n associated with the previously registered encrypted biometric data need not be stored in the key repository any longer.

Finally, the second client device 600 can decrypt the updated encrypted biometric data $E(T^*)_i$ in step S116 using the secret key $k_i$ previously received from the third party server 500 in step S115 (not shown in FIG. 8)—which initially was used by the first client device 100 to encrypt the biometric data—to obtain the updated biometric data T* in the clear.

The clear-text updated biometric data T* of the user 200 is typically securely stored in step S117 at the second client device 600 instead of the previously stored biometric data T in a protected volatile or non-volatile memory to subsequently be used to authenticate the user 200 whom should be granted access, via the second client device 600, to a service provided by a third party server 500.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a first client device of updating previously registered encrypted biometric data of a user, the previously registered encrypted biometric data to be updated having been previously captured by the first client device and registered at a trusted network node, comprising:
   capturing new biometric data of the user to be used for updating the previously registered encrypted biometric data;
   encrypting the new biometric data using a key shared with a second client device;
   creating a first authentication token associated with the encrypted new biometric data, the first authentication token comprising a secret to be shared between the second client device and the trusted network node upon the second client device requesting the encrypted new biometric data; and
   submitting the new encrypted biometric data and the first authentication token to the trusted network node over a secure communication channel.

2. The method of claim 1, further comprising:
   after submitting the encrypted biometric data and the first authentication token to the trusted network node, receiving a message from the trusted network node when the previously registered encrypted biometric data has been replaced with the submitted encrypted new biometric data, if the trusted network node successfully has authenticated the first authentication token.

3. The method of claim 1, further comprising:
   generating a plurality of secrets to be shared between a corresponding plurality of second client devices and the trusted network node.

4. The method of claim 3, wherein encrypting the new biometric data comprises:
   obtaining a plurality of encrypted new biometric data sets by encrypting the new biometric data using keys shared with a corresponding plurality of second client devices.

5. The method of claim 4, wherein creating the first authentication token comprises:
   for each particular set of the plurality of encrypted new biometric data sets, creating a particular first authentication token associated with the encrypted new biometric data of the particular set, the particular first authentication token comprising: (i) one of the plurality of secrets and (ii) an identifier indicating a previously registered encrypted biometric data set to be replaced with the encrypted new biometric data of the particular set.

6. The method of claim 5, wherein the creation of the first authentication token further comprises:
   digitally signing the first authentication token with a private key of the first client device, wherein the submitting of the first authentication token to the trusted network node further comprises:
   submitting the digitally signed first authentication token to the trusted network node.

7. A method performed by a second client device of acquiring updated encrypted biometric data of a user of the second client device from a trusted network node, the encrypted biometric data having been updated at the trusted network node by a first client device, comprising:
   submitting a request to the trusted network node over a secure communication channel to receive the updated encrypted biometric data which has replaced previously registered encrypted biometric data of the user, the request comprising a second authentication token associated with the previously registered encrypted biometric data;
   receiving an authentication challenge from the trusted network node when the trusted network node authenticates the second authentication token;
   providing an authentication response to the received authentication challenge using a shared secret and the authentication challenge, the shared secret having been received earlier from the trusted network node upon the second client device acquiring the previously registered encrypted biometric data, and
   when the authentication response is correct, receiving the updated encrypted biometric data from the trusted network node and a new shared secret associated with the updated encrypted biometric data.

8. The method of claim 7, further comprising:
   receiving, from a third party network node with which the user of the second client device is to be authenticated, a secret key capable of decrypting the updated encrypted biometric data.

9. The method of claim 8, further comprising:
decrypting the updated encrypted biometric data using the received secret key; and
storing the updated biometric data in a secure storage.

10. The method of claim 7, wherein the second authentication token is: (i) received from a third party network node with which the user of the second client device is to be authenticated, and (ii) created by the first client device, the second authentication token comprising an encrypted data set including a generated random number, an identifier indicating the encrypted biometric data set to be replaced, and an index indicating a public key of the first client device, the public key used to authenticate the second authentication token.

11. The method of claim 10, wherein the encrypted data set is digitally signed with a private key of the first client device.

12. A method performed by a trusted network node of updating previously registered encrypted biometric data of a user of a first client device, comprising:
receiving, from the first client device over a secure communication channel, (i) encrypted new biometric data to be used for updating the previously registered encrypted biometric data and (ii) a first authentication token associated with the received encrypted new biometric data, the first authentication token comprising a secret to be shared between a second client device and the trusted network node upon the second client device requesting the encrypted new biometric data;
authenticating the received first authentication token;
replacing the previously registered encrypted biometric data with the received encrypted new biometric data; and
storing the secret to be shared.

13. The method of claim 12, further comprising:
submitting a message to the first client device confirming that the previously registered encrypted biometric data has been successfully updated.

14. The method of claim 12, wherein the authenticating of the first authentication token comprises:
acquiring a public key of the first client device, the method further comprising:
verifying, using the public key, the first authentication token.

15. The method of claim 12, further comprising:
receiving a request from a second client device over a secure communication channel to receive the updated encrypted new biometric data which has replaced the previously registered encrypted biometric data of the user, the request comprising a second authentication token associated with the previously registered encrypted biometric data;
authenticating the received second authentication token;
acquiring the encrypted new biometric data, the secret to be shared with the second client device, and a shared secret associated with the previously registered encrypted biometric data that has been replaced, from a key repository;
submitting an authentication challenge to the second client device;
receiving an authentication response based on the shared secret associated with the previously registered encrypted biometric data that has been replaced and the authentication challenge,
verifying that the authentication response has been correctly computed; and
when the authentication response has been correctly computed, submitting the updated encrypted new biometric data and the secret to be shared to the second client device.

16. The method of claim 15, further comprising:
checking that the second client device belongs to a set of trusted devices.

17. The method of claim 16, wherein the checking that the second client device belongs to a set of trusted devices is performed using a Trusted Computing, TC, verification approach.

18. The method of claim 15, wherein the received second authentication token comprises:
a data set including: (i) a random number generated by the first client device, (ii) an index indicating a public key of the first client device used to authenticate the second authentication token, and (iii) an identifier indicating the previously registered encrypted biometric data to be replaced,
wherein the data set is encrypted with the public key of the trusted network node by the first client device, and
wherein the encrypted data set was digitally signed with a private key of the first client device.

19. The method of claim 18, wherein the authenticating of the received second authentication token comprises:
decrypting the encrypted data set to obtain the index and the identifier.

20. The method of claim 19, wherein the authentication of the received second authentication token further comprises:
verifying that the second authentication token has not been previously presented to the trusted network node for said identifier, wherein if the second authentication token previously has been presented the authentication procedure is aborted.

21. The method of claim 20, wherein the verification that the second authentication token has not been previously presented to the trusted network node further comprises:
verifying that the random number obtained from decrypting the encrypted data set has not been previously presented to the trusted network node for said identifier.

22. The method of claim 18, wherein the acquiring of the updated encrypted biometric data from the key repository further comprises:
acquiring the public key of the first client device as indicated by said index, the method further comprising:
verifying the digitally signed and encrypted data set using the acquired public key of the first client device.

23. The method of claim 15, wherein the verifying that the authentication response has been correctly computed further comprises removing the shared secret associated with the previously registered encrypted biometric data that has been replaced from the key repository upon successful verification.

* * * * *